3 Sheets—Sheet 1.

W. J. FENDER,

Assignor of one-third to J. CUTHBERTSON.

Middlings Separator.

No. 9,706. Reissued May 17, 1881.

*Attest:*
F. H. Schott
J. J. Halsted

*Inventor:*
William J. Fender
By A. Cramford atty.

3 Sheets—Sheet 2.

W. J. FENDER,

Assignor of one-third to J. CUTHBERTSON.

Middlings Separator.

No. 9,706. Reissued May 17, 1881.

*Attest:*
*F. H. Schott*
*J. J. Halsted.*

*Inventor:*
*William J. Fender*
*By N. Crawford atty.*

W. J. FENDER,
Assignor of one-third to J. CUTHBERTSON.
Middlings Separator.
No. 9,706. Reissued May 17, 1881.
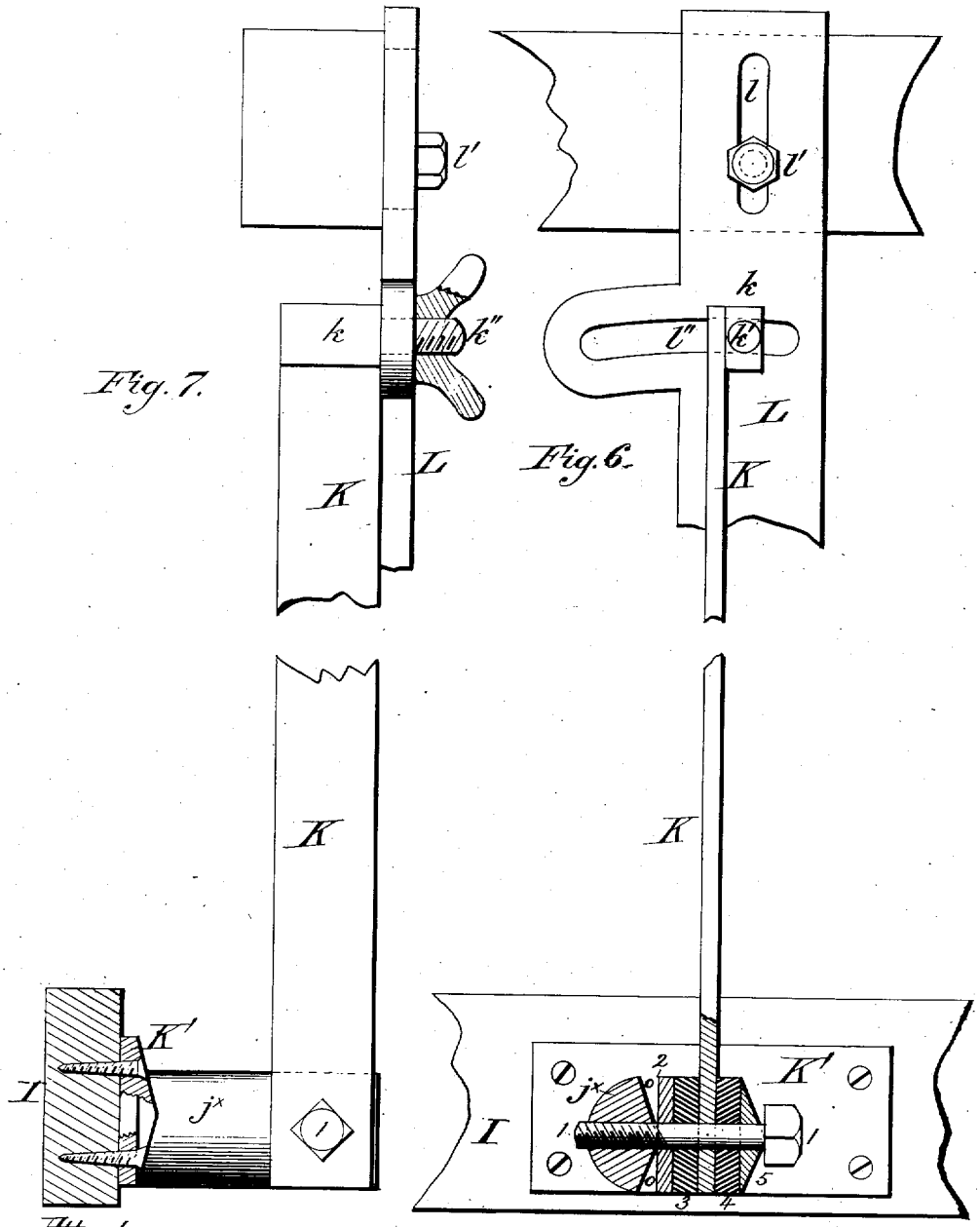
Attest:
A. H. Schott.
J. J. Halstat.
Inventor:
William J. Fender
by A. Crawford atty.

UNITED STATES PATENT OFFICE.

WILLIAM J. FENDER, OF MINNEAPOLIS, MINNESOTA, ASSIGNOR OF ONE-THIRD TO JAMES CUTHBERTSON, OF SAME PLACE.

MIDDLINGS-SEPARATOR.

SPECIFICATION forming part of Reissued Letters Patent No. 9,706, dated May 17, 1881.

Original No. 209,165, dated October 22, 1878. Application for reissue filed March 26, 1880.

*To all whom it may concern:*

Be it known that I, WILLIAM J. FENDER, of Minneapolis, in the county of Hennepin, in the State of Minnesota, have made certain Improvements in Middlings-Purifiers, of which the following is a specification.

The object of this invention is to improve that described in a patent granted to me February 9, 1875, No. 159,505; and it consists in the construction of the parts that form the improvement, as will be fully hereinafter described.

Figure 1:
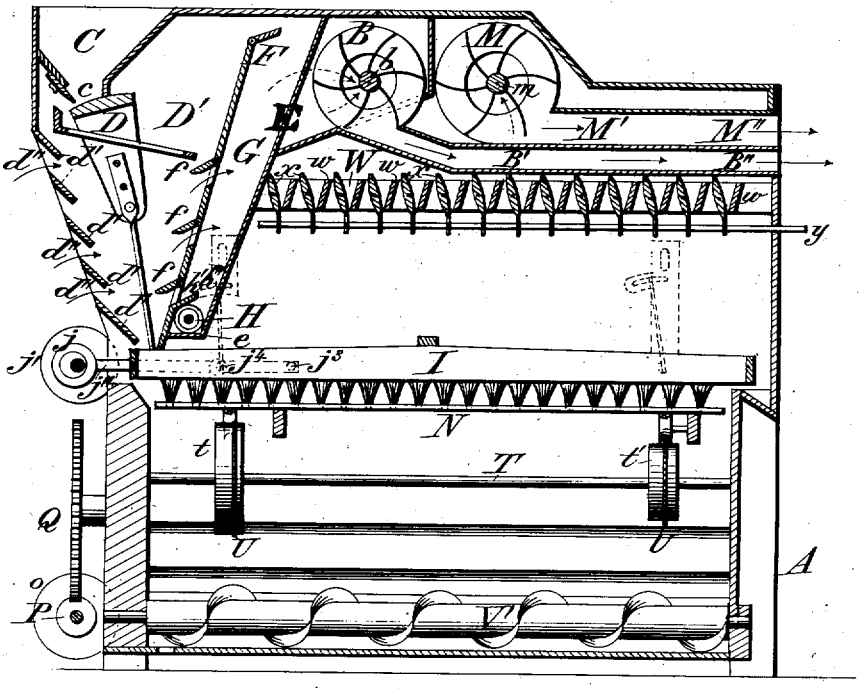
Figure 2:
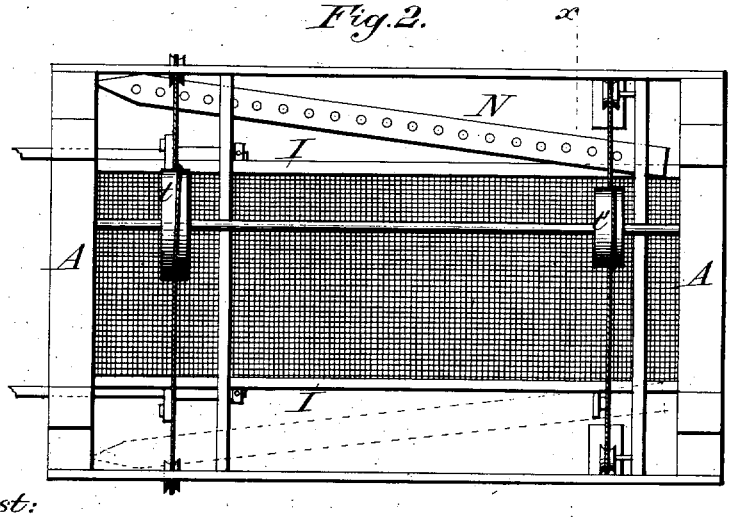
Figure 3:
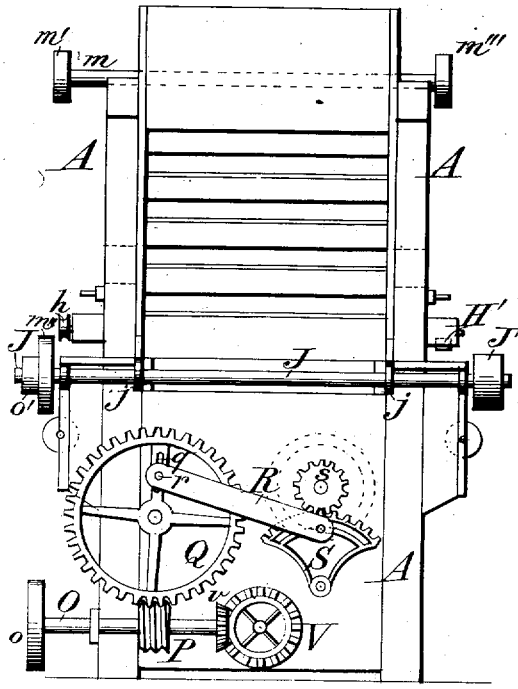
Figure 4:
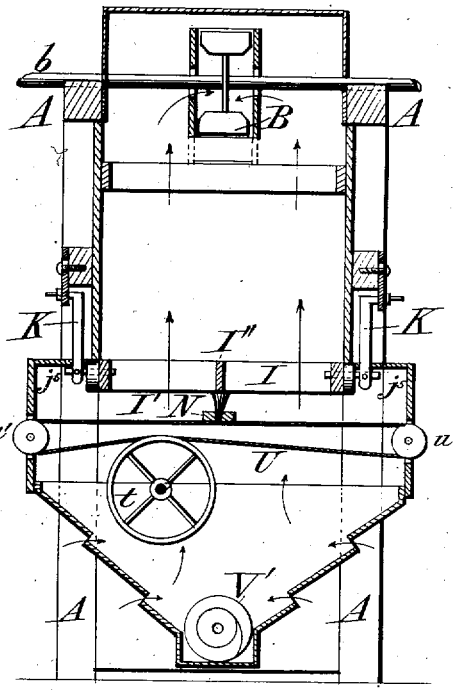
Figure 5:
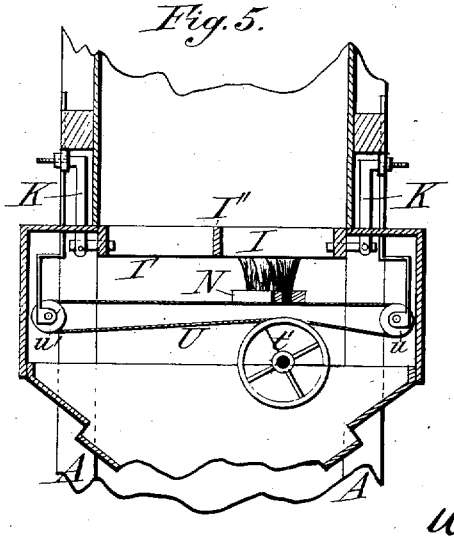

In the drawings, Figure 1 is an upright longitudinal view of machine. Fig. 2 is a plan view of the under side of the machine, looking upward. Fig. 3 is an end view of the machine, showing the operating devices. Fig. 4 is a central cross-section of Fig. 1. Fig. 5 is a broken cross-section on line *x x* in Fig. 2. Fig. 6 is a side view of the hanger and its attachment to the shaker-frame Fig. 7 is a transverse view of Fig. 6.

A represents the main frame of the machine, which contains all the moving and operating parts within it, or attached to it, in a similar manner to what is seen in my previous patent, as above cited.

B is a suction-fan, fast on transverse shaft *b*, and is revolved by a belt over pulley on shaft *b* from a pulley fast on another transverse shaft.

C is the middlings-receiving hopper at the top of the machine.

D is an oscillating convex middlings spreader or feeder, and receives the middlings upon its convex surface through an adjustable opening, *c*, at the bottom of the hopper C. This feeder or spreader is attached by its arms *d* to the shaker-frame, and receives its oscillating motion by the reciprocation of the shaker-frame, and causes an even-flowing sheet of middlings to fall from its convex surface into chamber D′; thence the middlings are evenly distributed across the width of the bolt-cloth on a reciprocating shaker. The outside end wall of chamber D′ is formed of inclined slats *d′*, with air-openings *d″* between them for the admission of outside air.

E is the inside inclined wall of chamber D′, and extends down to near the top of the reciprocating shaker, with a bottom, *e*, extending toward the outside of chamber D′, to intersect an inclined partition, F, that rises nearly to the top of said chamber D′. The lower portion of this partition is provided with pivoted slats *f*, that can be adjusted to allow a greater or less opening between them. This partition F divides chamber D′, as seen in Fig. 1, and forms a sub-chamber, G. Near the bottom of chamber G is a transverse revolving conveyer, H, made to revolve by a pulley, *h*, on its shaft, through a belt from another shaft and pulley. Over this conveyer H, in chamber G, is an inclined cover, *h′*, in which is a slot or opening, *h‴*, at its upper edge, running its whole length.

I is the reciprocating shaker-frame, with its fine bolt-cloth I′ on its bottom or under side, in the usual manner of constructing such frames.

I″ is an intermediate bar between the longitudinal side pieces of the shaker-frame I, and to the lower edge of which the bolt-cloth is attached and supported centrally of the width of the cloth on the shaker-frame, and retains it in a uniform plane against pressure from above by the weight of the middlings being purified thereon, or from pressure by the wiping-brush below or underneath the cloth, leaving the under surface of the bolt-cloth unobstructed, so that the brush sweeps the under side of the cloth evenly and uniformly.

J is the main shaft, placed transversely across and at the head end of the machine, and is revolved by any convenient power at the usual speed by pulley J′, and from which shaft the moving parts of the whole machine are put in motion.

*j j* are eccentrics on shaft J.

*j′ j′* are bands that surround the eccentrics and have straps *j″* extending along the outside of shaker-frame, and are attached thereto at their ends by a projecting stud, $j^3$.

$j^4$ is an eye in the arms of the straps. $j^5$ $j^5$ are studs projecting outwardly through eyes $j^4$, from and fast to the sides of the shaker-frame, the eye $j^4$ being as much larger than the stud in its diameter as the vibration of the shank at that point is out of a direct line caused by the revolution of the eccentric upon the shaft J, which gives the outer ends of the straps a perpendicular vibration.

At or near each of the corners of the shaker are the supporting-hangers, which are attached to the sides of the shaker-frame by the projecting studs $j^5$ and $j^\times$, which have holes through them to receive bolt 1, and have obtuse angular faces *o o*, against which is a flat disk metal washer, 2, a rubber washer, 3, then the spring-hanger K, a rubber washer, 4, next to the spring-hanger, and a metal washer, 5, having a flat surface bearing upon the rubber washer 4, and conical outer side bearing against the inside of the bolt-head 1. When put together, as seen in Fig. 6, it forms a yielding attachment, free from noise in operation, and never requiring any lubrication to make it work freely. These projecting studs $j^5$ and $j^\times$ may be cast with the plates K′, and secured to the shaker-frame by screws, as seen in Fig. 6. The spring-hangers K extend upward, and at their upper ends have a lug, *k*, upon one side, with a bolt-hole, *k′*, through it to receive bolt *k″*.

L is a plate having a perpendicular slot, *l*, near its top end, by which it is adjusted up or down, and held, when adjusted by the holding-screw *l′*, by turning the screw into the framing. *l″* is a curved slot in plate L, in which is placed bolt *k″*, and passing through hole *k′* in the lug on the spring-hanger, and in which curved slot the hanger K can be by the bolt *k″* adjusted to any angle required.

M is a suction-fan, fast on transverse shaft *m*, and is put in motion by the pulley *m′* by belt from pulley *m″* on main shaft J. Shaft *m* has another pulley, *m‴*, at its opposite end, and through a belt gives motion to shaft *b* and fan B.

N is a brush placed under the shaker-screen I′, and is as long as the screen, and is made to pass under the screen and sweep the fine adhering dust therefrom in an obtuse angle with the longitudinal sides of the shaker, or in the figure of a segment of a circle, across the under side of the screen, and at the end of its movement in one direction, when off the screen, it reverses its motion and returns back to the opposite side of the shaker, and again reverses its motion outside of or beyond the screen. By this new movement of the brush in the manner and direction described less power is required to drive the brush, for the brush, in its sweep, must bear more or less hard against the cloth of the screen and bend the bristles in order to successfully brush off the dust, and as the dust aproaches the sides of the shaker or screen the angle increases, hence it goes out of contact with the screen gradually, and the bristles assume their normal or straight position before the brush is returned in the opposite direction.

O is a short horizontal shaft, secured in proper bearings at the head of the machine, and has pulley *o* at its outer end, which is driven by belt from pulley *o′* on shaft J.

P is a worm-gear on shaft O, and revolves with it, gearing into toothed gear-wheel Q, which revolves on a short shaft.

R is a pitman, secured to wheel Q by bolt *r* in slot *q*, its other end secured to segment-gear wheel S by bolt or wrist-pin, by which construction, as the wheel Q revolves, it gives to the segment or quarter wheel an oscillating or vibrating motion in opposite directions; and gearing into this quarter-wheel is a toothed pinion, *s*, on shaft T, that extends longitudinally under the screen.

Secured to shaft T are pulleys *t* and *t′*. Pulley *t* is near the head end of the machine, and pulley *t′* is near the opposite end. Pulley *t* is much larger in diameter than pulley *t′*.

U is a cord, one end attached to pulley *t*, so that it will run on the outside of the pulley and pass around it, then go to the side of the machine, pass over a pulley, *u*, then back to the opposite side of the machine, around another pulley, *u′*, then to pulley *t* again, and be secured, as was the opposite end. A like cord passes around pulley *t′*, and operates in the same manner as the cord around pulley *t*. The brush N is attached securely to these cords that are around pulleys *t* and *t′*, and the vibration of the quarter-wheel S, turning pinion *s* in one direction, revolves the pulleys *t* and *t′* in the same direction, carrying the brush by the cords U to one side of the machine, when the quarter-wheel is moved in the opposite direction, causing the pinion *s* to reverse its motion, and with it the motion of pulleys *t* and *t′*, and make the brush sweep across the screen in the reverse direction. Pulley *t* being larger than pulley *t′*, a revolution of it will carry the end of the brush in the same direction much farther than pulley *t′*; hence the position of the brush as it sweeps toward both sides of the machine is seen in full and dotted lines in Fig. 2. By this construction the brush is made to perform a new movement in its sweep under the screen, saving power by the gradual departure off the edge of the screen, or in its reverse movement in coming outo the screen, and then reversing out of contact with the screen, and at the same time does not wear the cloth on the shaker by the reversing of the brush under the screen against the cloth.

V is a gear-wheel at the end of a conveyer, V′, at the head of the machine, and is put in motion by the gear-wheel *v* on shaft O.

The middlings being fed into hopper C and gaged at opening *c*, then go onto the vibrating convex spreader D, and by it are distributed in an even sheet into chamber D′, near the head of the machine. Suction-fan B, being in motion, draws the air from outside the head of the machine through air-spaces *d″* into chamber D′, taking from the middlings all, or nearly all, the light stuff, passing it through air-spaces between slats *f* in the partition that divides chamber D′ from chamber G, then into and through the fan-case of fan B into exit-pipe B′, and out of the machine at opening B″, as indicated by arrows. If there be heavy dust carried into chamber G, and too heavy to be carried out with the light particles at B″ by fan B, such heavy dust will fall down to the bottom of chamber G through opening *h″* into conveyer H, and be forced out of the side of the machine at opening H′ in the out end of the conveyer-case. This operation prepares the middlings for screening by separating most of the foreign matter and leaving the same nearly pure.

M is a second and larger suction-fan than B, and draws air from underneath the reciprocating screen through air-spaces between the gathering-slats at the bottom of the machine, thence passing upward through the screen in contact with the middlings and other particles that may have been carried there, and this air-current, permeating all parts of the screen as it reciprocates, tends to and does lift the light dust and coarse particles too large to pass through the screen or go off as tailings, or to be carried up with the current of air into fan M, and thence be expelled out of the machine through exit-pipe M′ at M″.

In order to graduate or control the force of the air-current caused by fan M, a set of inclined partitions, *w*, are arranged in a chamber above the screen, in connection with pivoted valves *x*, which valves are secured at their lower edges to a rod, *y*, that projects out of the machine, and by which the openings between the partitions and valves may be enlarged or diminshed at will.

Having thus described my invention, what I claim is—

1. In a middlings-purifier, the combination of the chambers D′ and G, divided by partition F and conveyer H, with the suction-fan B, substantially as and for the purposes described.

2. The chambers D′ and G, partition F, having pivoted slats *f* and air-spaces between them, in combination with the suction-fan B, constructed and operating as set forth, whereby much of the light dust is taken from the middlings, substantially as described.

3. The spring-hangers K, attached to the shaker-frame by the stud $j^5$ or $j^\times$, washers 2 3 4 5, and bolt 1, in combination with the plate L, having slots *l′* and *l″* and bolt *k″*, substantially as described.

4. The eccentrics *j*, vibrating eccentric straps *j′*, having arms or shanks *j″*, and eye $j^4$, in combination with the attaching-stud $j^3$, and projecting guide-stud $j^5$, and the shaker-frame I, as and for the purposes described.

5. The combination of cords U, pulleys *t t′*, of unequal diameters, and brush N, constructed and operating as described.

6. In a middlings-purifier, the brush N, operating across the under side of the screen, one end moving faster than the other obliquely to the direction of the flow of the middlings on the screen, substantially as described.

7. The series of pivoted valves *x*, inclined partitions *w*, and regulating-rod *y*, in combination with the suction-fan M, as and for the purposes described.

8. In a middlings-purifier, the combination of the suction-fan M, shaker I, screen I′, and brush N, sweeping the under side of the screen at an obtuse angle with the flow of the middlings on the screen, and reversing its movement while off the cloth, substantially as described.

WILLIAM J. FENDER.

Witnesses:

CHAS. A. PLAMONDON,

GEORGE PLAMONDON.